UNITED STATES PATENT OFFICE.

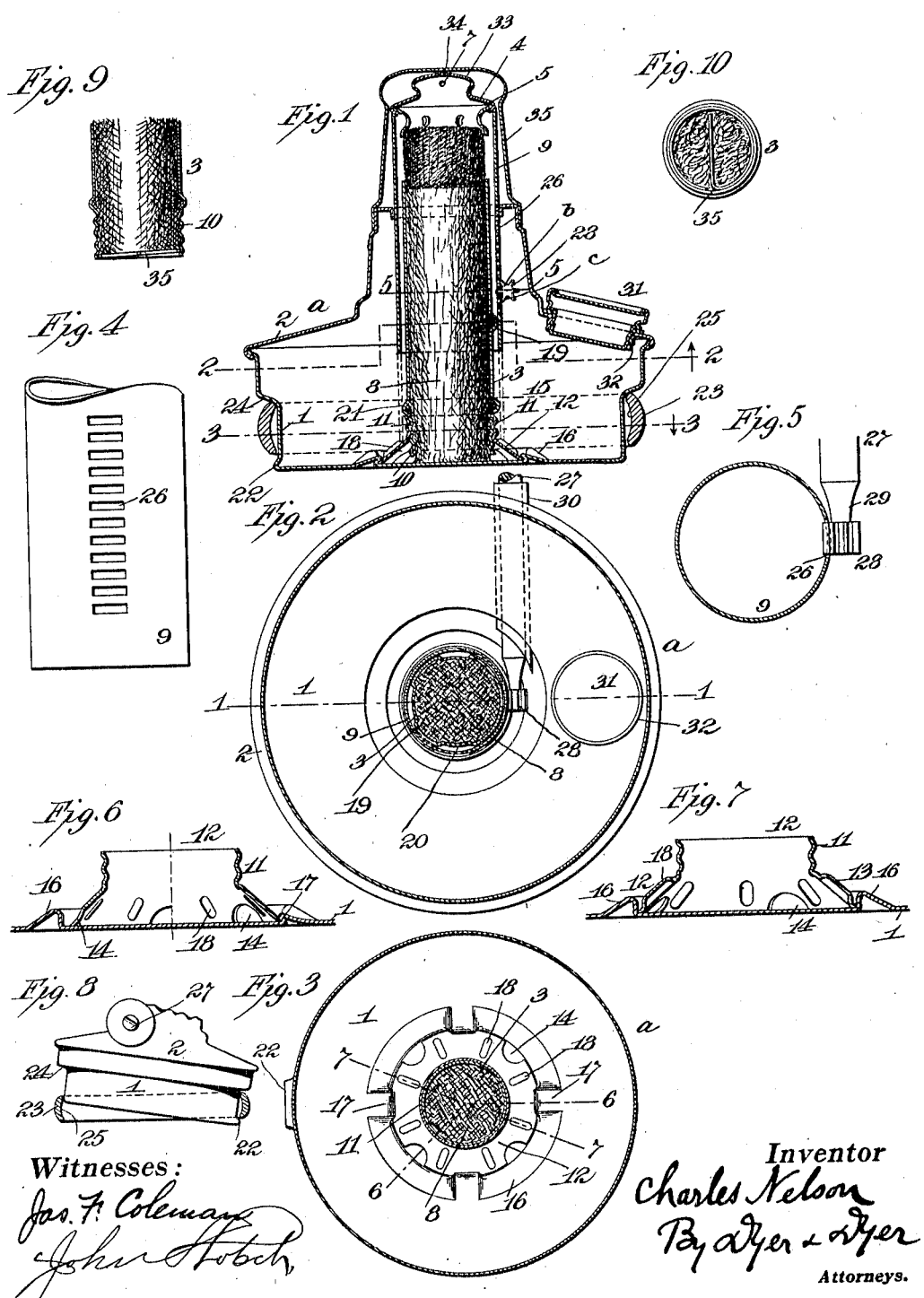

CHARLES NELSON, OF BROOKLYN, NEW YORK, ASSIGNOR TO S. STERNAU & CO., A COPARTNERSHIP COMPOSED OF SIGMUND STERNAU AND LIONEL STRASSBURGER, OF NEW YORK, N. Y.

ALCOHOL-LAMP.

1,099,191. Specification of Letters Patent. Patented June 9, 1914.

Application filed December 19, 1908. Serial No. 468,260.

*To all whom it may concern:*

Be it known that I, CHARLES NELSON, a subject of the King of Sweden, residing in the borough of Brooklyn, in the county of Kings, State of New York, have invented a new and useful Alcohol-Lamp, of which the following is a specification.

This invention relates to improvements in alcohol lamps, and has particular reference to lamps which are used in connection with chafing dishes, coffee machines, and the like.

The object of the invention is to improve the lamp in certain details, as will more fully appear in the accompanying drawings, and following specification.

In the drawings: Figure 1 is a vertical section taken on the line 1—1 of Fig. 2 of a lamp embodying my invention. Fig. 2 is a horizontal section on the line 2—2 of Fig. 1 looking in the direction of the arrow. Fig. 3 is a similar view on the line 3—3 looking in the direction of the arrow. Fig. 4 is an enlarged side elevation of a portion of the controlling tube. Fig. 5 is a section on the line 5—5 of Fig. 1, but enlarged. Fig. 6 is a section on line 6—6 of Fig. 3 enlarged, and Fig. 7 is a section on line 7—7 of Fig. 3 enlarged. Fig. 8 is a detailed view of lamp and lamp ring. Fig. 9 is a detail of the lower end of a modified form of wick tube; and Fig. 10 is an end view of the same.

In all of the views, the same parts are designated by similar reference characters.

In carrying out my invention, I provide a font $a$, comprising a body portion 1, and a top portion 2. Both of these parts are preferably made of sheet metal, and preferably spun to shape. The top portion 2 is flanged in engagement with the bottom portion, and the two parts are secured together with solder.

So much of the lamp described is no different from the ordinary form of lamp, and I make no claim to novelty except as to details which will be described.

The wick tube 3 is preferably made of metal, and is provided with a wick cap 4. This wick cap has an outjutting flange 5. Below the flange are wick openings, and above the flange are gas vents 7. The tube is adapted to be filled with wick 8, which is best made with the lower portion of cotton wicking, and the upper portion, behind the wick openings, of asbestos.

So much of the wick tube described is not new. I have illustrated such a wick tube in the patent issued to me March 18, 1913, No. 1,056,047. This wick tube is adapted to lie within the font, and be secured to the bottom thereof. Means for securing it to the bottom is provided, and the wick tube is modified to be adapted for the application of such means, and such means is novel, and will be described at the proper time.

The lamp is adapted to be controlled by means of a controlling tube 9 which surrounds the wick tube, and is adapted to be lowered or raised to disclose or mask the wick openings. This controlling tube in itself is not new. I make no claim to it, but the details by means of which it is raised or lowered, I believe to be new, and such details will be described at the proper time.

Returning to the wick tube and the manner in which it is secured to the bottom of the font, I provide the lower end of the tube with threads 10. These threads 10 engage with threads 11 formed in a socket 12. The socket is best made of metal, and is shown in detail in Figs. 6 and 7. It comprises a substantially cylindrical portion the same length as the threads 11, and a flaring base portion provided with perforations 14. These perforations are shown as formed by notches made in the lower edge of the flaring base portion. The socket is adapted to be secured to the bottom of the font and the wick tube inserted therein engaging the threads 10 with the threads 11. When in proper position, the lower end of the tube will be above the bottom of the body portion 1. The wick 8 is adapted to extend below the lower end of the tube 3, as shown in Fig. 1. The lower end of the tube should be a sufficient distance above the bottom of the font so that alcohol, or whatever fluid is used for burning, will enter the base of the socket through the perforations 14 and come into contact with the wick. By sustaining the wick tube in the socket which holds its lower edge clear of the bottom of the font, the usual openings, such as are illustrated in the drawings of my Patent No. 1,056,047, for the entrance of fluid from the font to the wick are done away with. This produces a cheaper wick tube. Also it permits the lamp to be burned until the alcohol is entirely or practically all evaporated, whereas in the former construction with the openings above the base of the tube as the only means for entrance of alcohol to the wick, when the level of the alcohol falls below such openings, the lamp will cease to burn. Another advantage incident to my new construction is that it is not important that the threads 10 be short, as it is in the prior form, in order to keep the entrance openings to the wick as low as possible. On the contrary, in my new construction the threads may be made deeper, longer and coarser than before. This permits the threads to be made by a rolling operation which is much cheaper than threads made by the cutting operation, as has been the former practice.

I attach the socket 12 to the body portion of the font in a novel manner. The means of attachment comprises a circular flange 16 formed in the base of the body portion. The internal diameter of this flange is practically the same as the greatest external diameter of the base of the socket. The inner wall of the flange 16 is at right angles to the base of the body portion, as shown in Fig. 7. When the socket is in place, its flaring base portion rests upon the base of the font and within the flange, as shown in Fig. 7. While in this position certain portions of the flange 16 are pinched in at 17, as shown in Figs. 1, 3 and 6. These pinched in portions, as shown in Fig. 3, are four in number, but the number may be varied as desired. Preferably they are located intermediate the perforations 14, but the exact location is immaterial.

The peripheral length of the pinched in portions may be varied, but it is preferably small so that the metal forming the font may be distorted without breakage. The shape of the flange 16 insures the proper disposition of the socket. These pinched in portions engage with the flaring base portion of the socket, and thereby hold it firmly in place. If desired solder may be used in addition although this is not ordinarily necessary.

For the purpose of strengthening the flaring base portion of the socket, to prevent it becoming distorted if force is exerted in an upward direction on the wick tube, I provide such flaring base portion with strengthening ribs 18. These strengthening ribs I prefer to make by striking up the material of the flaring base portion to produce a rib which will extend substantially throughout the depth of the flaring base portion. These strengthening ribs are shown as eight in number, and are located alternately between the pinched in portions 17 and the perforations 14. These strengthening ribs prevent any possibility of the flaring base portion becoming distorted should excessive pressure in an upward direction be applied to the wick tube.

The controlling tube 9 is guided vertically in its movements within the lamp by mechanism which possesses novel features. This guide is carried by the wick tube, and yet is so formed as to permit the escape of vapor from the font, which is essential to the proper operation of the lamp. The guide comprises an annular protuberance 19, best formed integral with the walls of the wick tube and struck out therefrom. The depth of the protuberance is such that its external diameter is slightly less than the internal diameter of the controlling tube, hence, the latter can freely slide upon the same without binding.

The annular protuberance 19 is provided with notches or interruptions 20, which permit the escape of gas from the font.

The wick tube, near its lower end, is provided with an additional guide 21, which is made similar in all respects to the guide 19, and is provided with notches as illustrated in connection with such guide. The additional guide 21 also serves as a stop to prevent the wick tube 3 from coming in contact with the bottom of the font and thereby preventing access of the alcohol to the wick.

The controlling tube is elevated or depressed for the purpose of controlling or extinguishing the flame by means of mechanism, which I believe to be to some extent novel. This mechanism includes a rack 26 formed in the tube, and a pinion on the elevating shaft. Instead of employing a rack as heretofore made, I produce a rack 26, see Fig. 4, by making a series of vertically alined rectangular slots. The elevating shaft 27, which is provided with a stuffing box, a locking spring and an actuating wheel, not shown, but illustrated in my patent before referred to, carries the pinion 28 on its inner end. The pinion is preferably made integral with the shaft, and to avoid waste of material is of no greater diameter than the shaft. The pinion is connected to the shaft by a reduced portion forming the neck 29. This neck upon referring to Fig. 5, will be seen to taper along concave lines from the cylindrical portion of the shaft to the pinion. By making the neck of this configuration it will be the same as the periphery of the cutting tool which defines the openings between the teeth of the pinion. It is also of a shape which will permit the neck to clear the walls of the controlling tube, when the parts are in engagement, as shown in Fig. 5. The comparatively wide face of the pinion, combined with the relatively wide teeth of the rack produces a strong structure which will not be readily broken. Another advantage of making the pinion of the diameter no greater than the shaft is that it can be introduced through the supporting tube 30 from the outside.

One feature of advantage in my improved lamp, as illustrated in Fig. 1, is that when raising the controlling tube to cause it to come into contact or engagement with the outjutting flange 5, there will be no breakage of the parts should considerable force be employed in rotating the elevating shaft 27. This end is obtained by using securing means for the base of the wick tube already described in combination with a broad face pinion and a broad tooth rack. Heretofore, so far as I am aware, when the wick tube is secured to the font by means of insecure means, in order to prevent it from being broken away from such securing means the rack is curtailed in length and does not extend below the point $b$ in Fig. 1. By such a structure the tooth $c$ is relied upon to come into contact with an unperforated portion of the wall of the wick tube and serves as a stop to prevent further rotation of the elevating shaft. This throws an undue strain upon that tooth. By my present invention the rack extends below the point $b$, shown in Fig. 1 consequently when the controlling tube is elevated and its upper end forced into contact with the flange 5, the strain is upon the base of the teeth of the pinion, which engage with the rack and not upon the single tooth $c$. The strain is also transmitted to the fastening means at the base of the wick tube, which according to this invention can be made adequate for the purpose.

One feature of my invention consists in providing means for preventing the lamp from lifting out of its supporting ring when the controlling tube is being elevated. This is a source of trouble met with in this type of lamp, and is caused by the necessity of having the lamp loosely fitted in the supporting ring. There is no tendency of the lamp to be elevated out of its ring when depressing the controlling tube, because the pinion 28 being on one side of the center of the lamp is rotated in such a direction when lowering the tube as to keep the lamp within its seat. When the pinion is rotated the other way, the lamp has a tendency to lift up diagonally within the ring and thereby cause trouble. The mechanism which I have devised to attain this end comprises a stop 22, illustrated in Figs. 1 3 and 8. This stop is best made by being struck out from the metal forming the bottom of the font, and is on the side opposite to the pinion.

The ring 23 which forms a portion of a chafing dish, coffee machine or other utensil, is adapted to make a more or less loose fit with the font and supports the latter, which engages the ring with a flange 24. The font is introduced within the ring in the manner illustrated in Fig. 8, the stop 22 being introduced by inclining the font. When in position it lies as shown in Fig. 1. Any tendency of the lamp to tilt in the support and lift the edge opposite the pinion 28 is resisted by the stop 22 engaging with the bottom of the ring 23. The inside of the ring is shown as formed with concave walls 25 which permit the entrance of the lamp in the manner shown in Fig. 8.

Another feature of my invention has to do with the filling cap 31. This filling cap is screw-threaded on its periphery and engages with a flange 32. This flange heretofore has been formed separately from the font and soldered in place. According to my present invention the flange is made integral with the top portion 2 and is stamped to shape. This reduces the number of parts in the lamp and thereby curtails the expense.

In my patent before referred to, the gas vents 7 are arranged below the secondary flange 33. According to the present invention, they are arranged upon the periphery of such flange, and an additional gas vent 34 is arranged on the top of the wick tube. This arrangement of the gas vents in relation to the secondary flange, I find to be successful.

When the lamp is not in use, the upper portion of the wick tube is inclosed by a cover or cap 35 which is slipped over the neck of the top portion 2.

I find that it is not necessary to have the parts threaded together as a practical construction can be made without threads.

It is to be noted that the pinched in portions 17 form grooves or depressions in the circular flange 16. These grooves thus formed produce a means of entrance of the alcohol from the font into the space inclosed by the flange where it will be readily absorbed by the wick.

Figs. 9 and 10 illustrate a modified form of wick tube. The wick 8 does not extend beyond the lower end of the tube, as is shown in Fig. 1, but is stopped a short distance inside of the extremity. A stop or fastening is inserted into the tube to retain the wick in positon, and to prevent its extending beyond the end of the tube. The stop illustrated comprises a wire spring like device 35, engaging with the inner walls of the tube against the threads, and abutting against the end of the wick. The stop comprises a wire bent into a ring like body with a circular peripheral portion which engages with the tube and a transverse portion forming a limb which engages with the wick. This stop keeps the wick under sufficient compression to prevent its losing its proper density when outside of the lamp, as when used in reserve as a new wick and tube. Any other form of stop may be employed.

The tube, with the stop, may be used, which will require that the tube 6 be introduced farther into the font, or if that is not done, then the fuel cannot be drawn off to the same degree. If desired the stop may be removed before the tube is introduced into the lamp, thus allowing the wick to expand, if it has a tendency to do so, to the position shown in Fig. 2.

In accordance with the provisions of the patent statutes, I have described the principles of my invention, together with the apparatus which I now consider to represent the best embodiment thereof; but I desire to have it understood that the apparatus shown is merely illustrative and that the invention can be carried out in other ways.

Having now described my invention, what I claim as new and desire to secure by Letters Patent is:—

1. An alcohol lamp having a font, and a wick tube, a controlling tube surrounding the wick tube, a socket for sustaining the wick tube within the font, said socket having a threaded neck, threads on the wick tube engaging with the neck, and an interrupted shoulder on the wick tube adapted to engage with the neck, and limiting the downward movement of the wick tube, the said controlling tube surrounding the shoulder when in lowered position.

2. An alcohol lamp having a font, the said font having a circular flange in the bottom, in combination with a socket having a flaring base portion, and pinched in portions of the circular flange engaging with the base portion, for sustaining it in position.

3. An alcohol lamp having a font, with a circular flange in the bottom, in combination with a socket having a flaring base portion, which lies within the flange, pinched in portions in the flange, engaging with the base portion, and notches in the base portion forming entrance openings to the socket.

4. An alcohol lamp having a font, with a circular flange in the bottom thereof, in combination with a socket having a flaring base portion, pinched in portions in the socket, engaging with the base portion, and ribs in the flaring base portion for strengthening the latter, such ribs lying between the pinched in portions.

5. An alcohol lamp having a font, a wick tube, and a controlling tube surrounding the wick tube, the wick tube having a guide for guiding the controlling tube, such guide being formed of an annular protuberance stamped out of the material of the wick tube, such protuberance being interrupted at intervals, forming a notch or notches to permit the escape of vapor from the font.

6. An alcohol lamp, having in combination, with a controlling tube having a series of vertically alined slots, and an elevating shaft tangentially arranged in relation to the tube, a pinion which engages with the slots to move the tube, the said pinion being carried by the elevating shaft, and formed integral therewith, the said pinion being connected to the shaft by a concave neck.

7. An alcohol lamp, having a controlling tube with a series of vertically alined slots, and an elevating mechanism for the tube, said elevating mechanism including an elevating shaft, and a pinion formed integrally therewith, such pinion having teeth which enter the slots, the said shaft lying within a supporting tube, the bore of the tube being of substantially the same diameter as the shaft, the diameter of the pinion being no greater than that of the shaft, so that the shaft and the pinion may be introduced from without, and a reduced portion of the shaft adjacent to the pinion.

8. A burner for an alcohol lamp comprising an open ended wick tube with internal corrugations, and a wick and a stop lying across the wick, and engaging with the corrugations and thus held in engagement with the end of the wick.

9. A wick tube for an alcohol lamp, comprising an open ended threaded tube, a wick and a stop formed of wire bent to form a ring like portion which engages with the threads and a transverse limb which engages with the end of the wick.

This specification signed and witnessed this 17th day of Dec., 1908.

CHARLES NELSON.

Witnesses:
ROBT. E. TAYLOR,
FRANK J. HILL.